United States Patent
Zuniga et al.

(10) Patent No.: US 8,081,658 B2
(45) Date of Patent: Dec. 20, 2011

(54) METHOD AND SIGNALING PROCEDURE FOR TRANSMISSION OPPORTUNITY USAGE IN A WIRELESS MESH NETWORK

(75) Inventors: Juan Carlos Zuniga, Montreal (CA); Sudheer A. Grandhi, Mamaroneck, NY (US); Marian Rudolf, Montreal (CA); Joseph S. Levy, Merrick, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 173 days.

(21) Appl. No.: 11/739,413

(22) Filed: Apr. 24, 2007

(65) Prior Publication Data

US 2007/0248117 A1 Oct. 25, 2007

Related U.S. Application Data

(60) Provisional application No. 60/794,468, filed on Apr. 24, 2006.

(51) Int. Cl.
*H04J 3/16* (2006.01)
(52) U.S. Cl. ........................................ 370/468
(58) Field of Classification Search .............. 370/468, 370/346, 464, 449, 477
See application file for complete search history.

(56) References Cited

U.S. PATENT DOCUMENTS

| | | | | |
|---|---|---|---|---|
| 2002/0051425 | A1* | 5/2002 | Larsson | 370/252 |
| 2002/0181425 | A1* | 12/2002 | Sherman | 370/338 |
| 2003/0200441 | A1* | 10/2003 | Jeffries et al. | 713/181 |
| 2004/0147226 | A1 | 7/2004 | Matsuo et al. | |
| 2005/0078707 | A1* | 4/2005 | Maltsev et al. | 370/471 |
| 2006/0050709 | A1* | 3/2006 | Sung et al. | 370/394 |
| 2006/0171362 | A1 | 8/2006 | Garg et al. | |
| 2007/0002814 | A1* | 1/2007 | Benveniste | 370/338 |
| 2007/0058605 | A1* | 3/2007 | Meylan et al. | 370/346 |
| 2007/0160021 | A1* | 7/2007 | Xhafa et al. | 370/338 |
| 2007/0263567 | A1* | 11/2007 | Habetha et al. | 370/329 |

FOREIGN PATENT DOCUMENTS

| WO | 2005/099195 | 10/2005 |
|---|---|---|
| WO | WO 2005/099195 | * 10/2005 |

OTHER PUBLICATIONS

Stephens et al. "IEEE P802.11 Wireless Lans, Joint Proposal: High Throughput Extension to the 802.11 Standard: MAC", IEEE 802.11-05/1095r5, (Jan. 13, 2006).*

(Continued)

*Primary Examiner* — Derrick Ferris
*Assistant Examiner* — Mang Yeung
(74) *Attorney, Agent, or Firm* — Volpe and Koenig, P.C.

(57) ABSTRACT

In accordance with a preferred embodiment, the present invention comprises a method for using the remaining TxOP time by the peer node to forward traffic to a different destination, a method for using the remaining TxOP time by the original node to send traffic to a different destination, a method for using the remaining TxOP time by a neighbor to send traffic to the original node, a method for using the remaining TxOP time by a neighbor to send traffic to another node, a method to signal the reuse rules of the remaining TxOP time, and a method to efficiently relinquish/truncate a TxOP to reset the NAV for the neighborhood.

18 Claims, 3 Drawing Sheets

OTHER PUBLICATIONS

IEEE, *IEEE P802.11n/D2.00 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Amendment <Number>: Enhancements for Higher Throughput*, (Feb. 2007).

IEEE, *IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Amendment: Medium Access Control (MAC) Quality of Service (QoS) Enhancements*, IEEE P802.11e/D13.0, (Jan. 2005).

Fischer et al., *Joint Proposal MAC Detail*, IEEE 802.11-05/1165r5, (Jan. 2006).

IEEE Computer Society, *IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 8: Medium Access Control (MAC) Quality of Service Enhancements*, IEEE Std 802.11e-2005, (Nov. 11, 2005).

IEEE, *Draft Standard for Information Technology—Telecommunications and Information Exchange Between Systems—Local and Metropolitan Area Network—Specific Requirements, Part 11: Wireless LAN Medium Access Control (MAC) and Physical Layer (PHY) Specifications*, IEEE P802.11-REVma/D5.2, (Reaffirmed 2003).

IEEE, *Draft Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications*, IEEE P802.11-REVma/D8.0, (2006).

IEEE, *IEEE P802.11n/D1.0 Draft Amendment to Standard [FOR] Information Technology—Telecommunications and Information Exchange Between Systems—Local and Metropolitan Networks—Specific Requirements—Part 11: Wireless LAN Medium Access Control (MAC) and Physical Layer (PHY) Specifications: Enhancements for Higher Throughput*, (Mar. 2006).

IEEE, *IEEE P802.11n/D2.00 Draft STANDARD For Information Technology—Telecommunications And Information Exchange Between Systems—Local And Metropolitan Area Networks—Specific Requirements —Part 11: Wireless LAN Medium Access Control (MAC) And Physical Layer (PHY) Specifications: Amendment <Number>: Enhancements For Higher Throughput*, (Feb. 2007).

IEEE, *IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications: Amendment: Medium Access Control (MAC) Quality of Service (QoS) Enhancements*, IEEE P802.11e/D13.0, (Jan. 2005).

IEEE, *Information Technology—Telecommunications and Information Exchange Between Systems—Local And Metropolitan Area Networks—Specific Requirements—Part 11: Wireless LAN Medium Access Control (MAC) and Physical Layer (PHY) Specifications*, IEEE Std 802.11-1997, (Approved Jun. 26, 1997).

Stephens et al., "IEEE P802.11 Wireless LANs, Joint Proposal: High Throughput Extension to the 802.11 Standard: MAC", IEEE 802.11-05/1095r5, (Jan. 13, 2006).

Yang, "Issues for Mesh Media Access Coordination Component in 11s, IEEE P802.11 Wireless LANs," IEEE 802.11-04/0968R13, (Jan. 19, 2005).

\* cited by examiner

FIG. 3

| OCTETS:2 | 2 | 6 | 6 | 6 | 2 | 6 | 2 | 4 | 0-2312 | 4 |
|---|---|---|---|---|---|---|---|---|---|---|
| FRAME CONTROL | DUR | ADDRESS 1 | ADDRESS 2 | ADDRESS 3 | SEQ CONTROL | ADDRESS 4 | QoS CONTROL | ENHANCED MESH FORWARDING CONTROL | FRAME CONTROL | FRAME CONTROL |

MAC HEADER

| 31 | 23 | 8 7 | 0 |
|---|---|---|---|
| RDG/MORE-PPDU BIT, OTHER CONTROL BITS AND RESERVED BITS | MESH E2E SEQ | TIME TO LIVE (TTL) | |

FIG. 5

| OCTETS:2 | 2 | 6 | 6 | 6 | 2 | 0 OR 6 | 0 OR 2 | 3 | 0-4 | 0-2312 | 4 |
|---|---|---|---|---|---|---|---|---|---|---|---|
| FRAME CONTROL | DUR | ADDRESS 1 | ADDRESS 2 | ADDRESS 3 | SEQ CONTROL | ADDRESS 4 | QoS CONTROL | MESH FORWARDING CONTROL | NEW CONTROL FIELD FOR RDG SIGNALING | BODY | FCS |

MAC HEADER

40

METHOD AND SIGNALING PROCEDURE FOR TRANSMISSION OPPORTUNITY USAGE IN A WIRELESS MESH NETWORK

CROSS REFERENCE TO RELATED APPLICATION(S)

This application claims the benefit of U.S. Provisional Application No. 60/794,468, filed on Apr. 24, 2006, which is incorporated by reference as if fully set forth.

FIELD OF INVENTION

The present invention is related to wireless communication systems. In particular, the present invention is related to a method and signaling procedure for transmission opportunity usage in a wireless mesh network.

BACKGROUND

In a typical Wireless Local Access Network (WLAN) network, all devices contend for accessing the wireless medium. The basic Medium Access Control (MAC) mode of contention is based on the Carrier Sensing Multiple Access (CSMA) mechanism. In order to enhance the performance of CSMA over the wireless medium, some modifications have been proposed. For instance, the original 802.11 standard (Rev1997) specifies CSMA with collision avoidance (CSMA/CA) and lately the 802.11e amendment specifies enhancements to provide a better Quality of Service (QoS).

One of the enhancements introduced by 802.11e is the concept of a transmission opportunity (TxOP). During a TxOP, multiple packets can be transmitted during the granted time. The TxOP has proven to be a very efficient enhancement to the basic MAC. The main idea with the introduction of a TxOP is to limit the overall amount of time a Station (STA) can spend on a channel once it has won contention. Before the advent of 802.11e, a STA, once it won the contention-based access, could transmit as long as it had data to transmit. This led to situations where a particular STA could basically pre-empt the wireless medium since it had so much data to transmit, resulting in detrimental side-effects to traffic streams by other STAs in the Basic Service Set (BSS). In order to remedy this problem, 802.11e introduced TxOPs with the idea that no STA could occupy the wireless medium longer than the TxOP length, and therefore, the medium would be opened up for contention by all STAs again at a minimum guaranteed rate.

However, sometimes a station may have no more data to transmit over the whole TxOP and therefore the bandwidth could be wasted. For these cases, the 802.11e amendment provides a mechanism to relinquish the medium so that other devices can use this previously granted time, and contend again for the medium. Here, a Contention Free (CF)-End frame, which can be sent only by an Access Point (AP), is used to reset the Network Allocation Vector (NAV) for all stations in the system and to communicate to the BSS the fact that contention could start again, even if it is prior to the expiration of the original TxOP. The 802.11n enhances this concept further by allowing any STA to truncate its TxOP with a CF-End.

Currently, the 802.11n group is working on further enhancements to the standard in order to provide for higher throughput. One of these enhancements is called Reverse Direction (RD). In conjunction with this, the 802.11e TxOP may be over-provisioned for a reverse-direction transmission in order to increase medium efficiency by reducing the number of medium-access attempts. The RD concept introduces a different usage for the remaining unused/over-provisioned time in a TxOP. Instead of relinquishing the medium to all stations to contend again, it specifically allows the peer station (i.e. TxOP receiver) to reuse the remaining time in a TxOP to send data on the reverse direction link to the originator.

One advantage of such Reverse Direction Grants (RDG) is that the contention for the medium by the peer station, which is time costly, does not take place anymore and overall relative medium-occupancy (ratio of data transmission to contention time per time period) is increased. Another advantage is the resulting reduction in latency for the reverse direction transmission (which might have otherwise been delayed by medium access contention), which is particularly useful in relatively symmetric real-time traffic scenarios such as VoIP.

In a WLAN mesh system, a set of two or more Mesh Point (MPs) are interconnected via IEEE 802.11 links. Each MP on a mesh network receives and transmits its own traffic, while acting as a router or forwarder for other nodes. Mesh networks are also known as multi-hop networks, since packets might be relayed more than once in order to reach their destination.

Accordingly, this represents a different paradigm as compared to the original WLAN standard, which addressed only star topologies (e.g. BSS, IBSS) and therefore single hop communications.

One specific problem occurring when adopting the current 802.11n RDG method to a WLAN Mesh context is that channel access contention-resolution (or deterministic) allocation is different than in a BSS context (like assumed in 802.11n) where all STAs are guaranteed to be in communication range with the AP. In a WLAN Mesh network, either node on one side of a particular Mesh link is in communication range with only a subset of other Mesh nodes. However, winning a TxOP by one of the nodes needs to pre-empt all other nodes in interference range from transmitting during this TxOP. Even if both nodes on the link can re-use the existing 802.11n RDG protocol to respectively arbitrate the use of a particular TxOP amongst themselves, the current mechanism cannot guarantee collision free communication in-between the pair, since no method exists to communicate the changed usage of the granted TxOP to at least the tier-1 neighbors.

An additional practical design problem currently not addressed by the original 802.11n RDG method is a practical question arising from WLAN Mesh network design where traffic is not carried back-and-forth across links of multiple Mesh nodes (but only between a particular pair of nodes in a BSS). There are many usage scenarios in which there can be substantially more gain in terms of node throughput and traffic latency when the remainder of a TxOP is used by a MP on a Mesh link for carrying received traffic forward (rather than using it to send traffic back to the originating MP in the reverse direction). It should be noted that this problem cannot arise in a traditional infra-structure type BSS, where any traffic is only carried back-and-forth in between a particular pair of devices, i.e. from/to the AP to/from a given STA.

Therefore, there exists a need for a method that realizes the gain with the 802.11n RDG method for WLAN mesh networks, that is not subject to the limitations of the existing art. There also exists a need for a method that improves upon the idea of efficiently re-using remaining TxOP time by MPs for WLAN Mesh networks.

SUMMARY

In accordance with a preferred embodiment, the present invention comprises a method for using the remaining transmission opportunity (TxOP) time by the peer node to forward traffic to a different destination, a method for using the remaining TxOP time by the original node to send traffic to a different destination, a method for using the remaining TxOP time by a neighbor to send traffic to the original node, a method for using the remaining TxOP time by a neighbor to send traffic to another node, a method to signal the reuse rules of the remaining TxOP time, and a method to efficiently relinquish/truncate a TxOP to reset the Network Allocation Vectors (NAV) for the neighboring nodes.

BRIEF DESCRIPTION OF THE DRAWING(S)

The foregoing summary, as well as the following detailed description of the preferred embodiments of the present invention will be better understood when read with reference to the appended drawings, wherein:

FIG. 3 is a frame format header in accordance with the present invention;

FIG. 4 is a representative field in a frame header in accordance with the present invention; and FIG. 5 is a frame format header in accordance with an alternative embodiment of the present invention.

DETAILED DESCRIPTION OF THE PREFERRED EMBODIMENT(S)

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), mesh node, mesh point (MP), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

The present invention is directed to mechanisms that improve the transmission opportunity (TxOP) usage when applied in wireless local access network (WLAN) mesh networks by using reverse direction (RD) concepts for new mesh network applications, and extending the CF-End frame usage for the mesh networks for efficient TxOP relinquishment/truncation.

Figure 1:
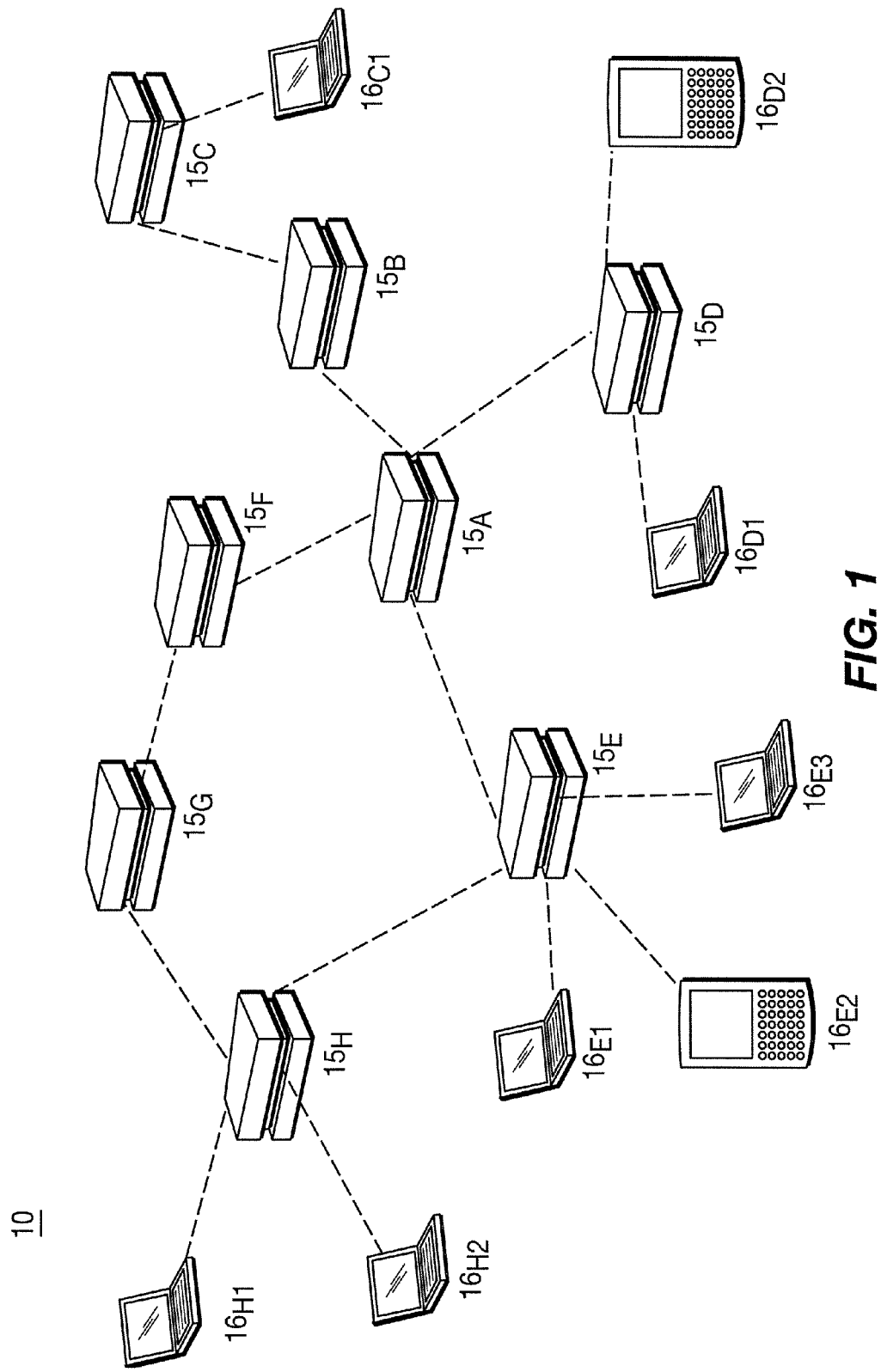
FIG. 1 is an exemplary wireless mesh architecture.
Figure 2:
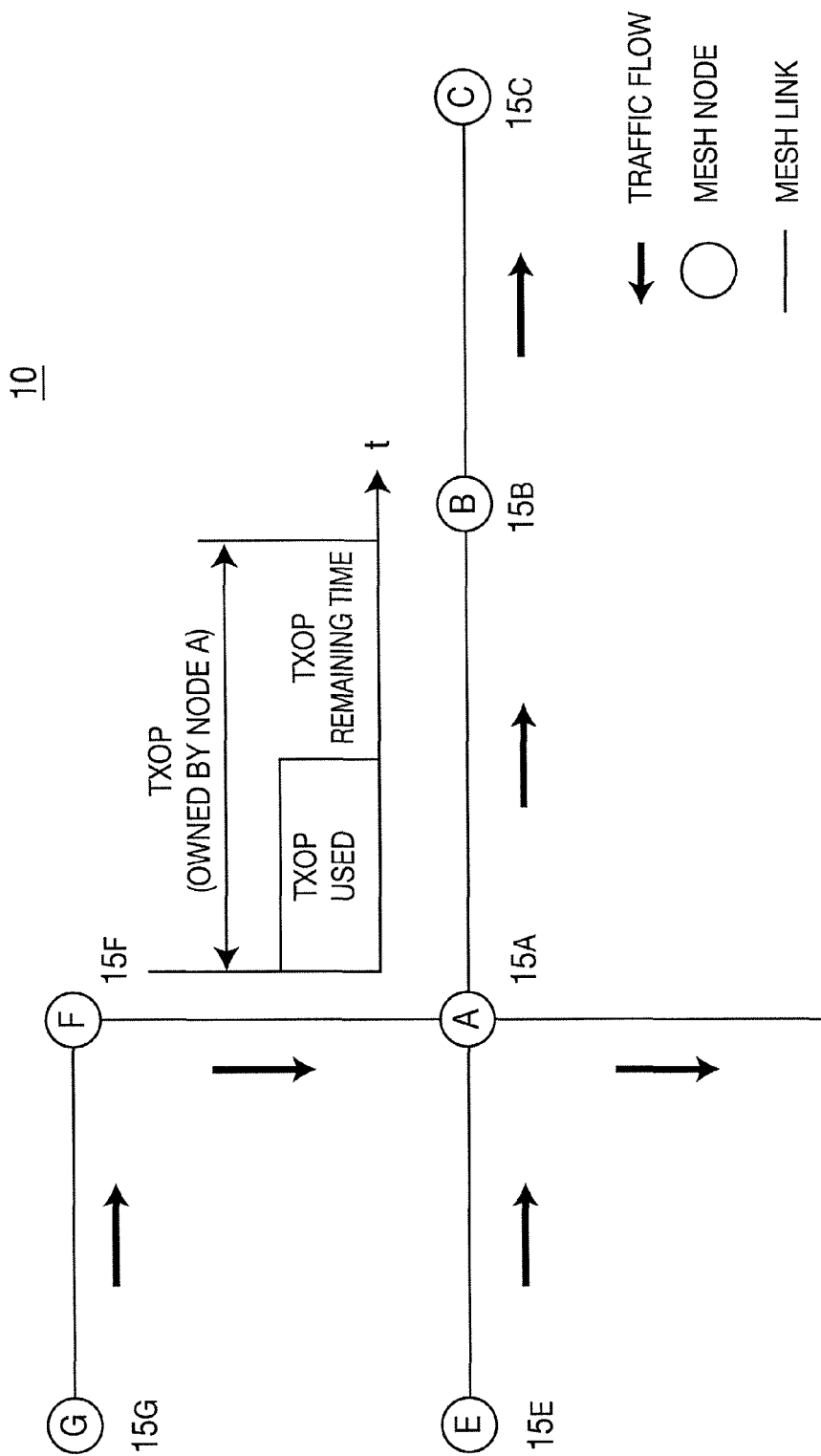
FIG. 2 shows a functional diagram of a plurality of mesh nodes performing a process in accordance with the present invention.

Referring to FIGS. 1 and 2, the present invention comprises a method and system for communicating in a wireless local access network (WLAN). In accordance with the present invention, a Basic Service Set (BSS) 10 comprises one or more mesh nodes (referred to herein as a mesh point (MP)) 15 ($15_A$, $15_B$, $15_D$, $15_E$, $15_F$, $15_G$ and $15_C$). MPs 15 facilitate the connectivity and intercommunication of wireless client(s) 16 ($16_{A1} \ldots 16_{G1}$). MP 15 comprises a processor (not shown) for storing at least one database (not shown). In accordance with an embodiment of the present invention, the database of MP 15 includes information indicating the current configuration of transmission opportunity (TxOP) usage, i.e., if supported, if enabled/disabled, and which modes are allowed (e.g., forward only, reverse direction only, or a combination of both) to be disclosed hereinafter.

As mentioned above, each processor of MPs 15 includes at least one database, but each processor does not necessarily include the TxOP configuration information. The TxOP configuration information can be either centrally stored within a database of a single MP 15 (e.g., $15_A$), stored in the database of each MP 15 (e.g., $15_A \ldots 15_G$), or stored in a database of a subset of the MPs 15 (e.g., $15_A$, $15_G$, and $15_C$). TxOP configuration information, regardless of how the information is stored, is changed or configured through signaling messages between MPs 15.

As known to those skilled in the art, a TxOP is an interval of time when a particular MP 15 has the right to initiate frame exchange sequences onto the wireless medium. This TxOP is defined by a starting time and a maximum duration. A MP 15 obtains access to this TxOP either by successfully contending for the channel, or by direct assignment from a coordinating entity.

As known to those skilled in the art, it is possible for a TxOP not to be fully used by the transmitting MP 15. In accordance with the present invention, the remaining/overprovisioned TxOP time can either be relinquished, given to the receiver MP to transmit traffic in the reverse direction or traffic unrelated to the traffic from originator MP, or given to a responder MP other than the originator MP or the receiver MP.

FIG. 2 illustrates a functional diagram of a plurality of MPs $15_A \ldots 15_C$ utilizing a method of communicating in a wireless communication system in accordance with a preferred embodiment.

Since the wireless medium is a shared environment, MP 15, in a two-hop vicinity of an originator MP $15_A$, for example, set their Network Allocation Vectors (NAVs) for the whole TxOP duration. This is especially true when a Request to Send (RTS)/Clear to Send (CTS)-like message exchange is used before the TxOP time, or when the coordination information (e.g. generated by a Hybrid Coordinator (HC), or carried on channel occupancy advertisements) is propagated beyond the first hop.

In any case, when MPs in the two-hop vicinity (e.g. $15_G$, $15_F$, $15_E$, $15_D$, $15_B$ and $15_C$) have already set their NAVs for the whole TxOP duration, it is preferred that any remaining unused time of the TxOP be reused by a receiving MP to forward the received packet from the originator MP one more hop. For example, if MP $15_A$ was the originating MP, receiving MP $15_B$ is able to use any remaining time in the TxOP to forward the received packet to MP $15_C$. In this sense, the received packet could be sent over two hops (e.g. MP $15_A$ to MP $15_B$, and MP $15_B$ to MP $15_C$), having contended only once for the medium, thereby decreasing the packet latency.

In an alternative embodiment, the receiver MP, for example $15_B$, uses the remaining TxOP time to send a different packet (e.g. one already waiting in the Tx queue) over the second hop. This packet may or may not belong to the same traffic flow (e.g. VoIP call) or traffic priority, depending on the configuration and policies of the network.

In another embodiment, the originator MP, for example MP $15_A$, uses the remaining TxOP time allocated for a TxOP (e.g. MP $15_A$ to MP $15_B$) to transmit a different packet to a MP other than the receiver MP (responder MP) (e.g. MP $15_A$ to MP $15_D$).

In yet another embodiment, control of the remaining TxOP time is passed to another node (e.g. MP $15_E$), other than the receiver MP (e.g. MP $15_B$), to transmit traffic to the originator MP (e.g. MP $15_E$ to MP $15_A$). This packet, again, may or may not belong to the same traffic flow (e.g. VoIP call) or traffic priority, depending on the configuration and policies of the network.

In still another embodiment, the remaining TxOP time may be utilized by allowing only neighbor MPs (i.e. MPs in the one-hop vicinity from the originator MP, e.g., $15_A$) to either send specific traffic (e.g. MP 15$_F$ to MP 15$_G$), or freely contend for access to the medium (e.g. let MP 15$_B$, MP 15$_D$, MP 15$_E$, and MP 15$_F$ contend). The advantage of this embodiment over the common relinquishing of the TxOP is that the number of MPs contending for the medium is potentially smaller than the overall number of MPs that could have set their NAVs for the TxOP. This smaller number of contenders provides them with a statistical advantage as compared to simply relinquishing the TxOP for all nodes.

In accordance with this embodiment, this subset of nodes (e.g. MP 15$_B$, MP 15$_D$, MP 15$_E$, and MP 15$_F$), therefore, access the medium in accordance with the TxOP information stored in database 18. As those skilled in the art know, access can be granted (1) sequentially—with a pre-defined or explicit sequence; (2) contention—contending normally for the medium or using different contention/transmission parameters (e.g. IFS, CWMin, CWMax) to better access the medium; (3) ordered contention—using different contention/transmission parameters that may be dependent on the type of traffic to be sent (e.g. related to the Access Category); or (4) a combination thereof.

Due to the flexibility that is provided by the present invention, the allocation of the remaining TxOP time can be restricted to a certain destination, for example, to the originator node (e.g. MP 15$_A$), another specific node (e.g. MP 15$_G$), or any other node in the network (e.g. MP 15$_N$).

In mesh network 10, the control exchange for reverse direction grant (RDG) can be achieved, in accordance with a preferred embodiment, using an explicit signal, preferably a flag on a packet (e.g. header) to notify a specific MP that the control of the TxOP has been passed on. Illustrated in FIG. 3 is an exemplary format of the packet data frames transmitted from one MP to another. As illustrated, an enhanced Mesh Forwarding Control header field 20 is included in the data frames and comprises reverse direction signaling. FIG. 4 is an exemplary illustration format of the "enhanced mesh forwarding control" field in accordance with the present invention. As illustrated in FIG. 4, enhanced mesh forwarding control field 20 preferably comprises a RDG/More-Physical layer protocol data units (PPDU)) bit (RDG/More-PPDU) bit and other signalling and reserved bits, signalling the granting the remaining TxOP, a mesh e2e seq., which enables controlled broadcast flooding, and Time to Live (TTL), which eliminates the possibility of infinite loops.

Referring now to FIG. 5, in an alternative embodiment, the TxOP holder, the originator MP, may pass control of the medium in a data frame, for example, by adding a new control field 40 to carry the RDG signalling (RDG/More-PPDU), preferably, along with (RDG/More-Physical layer protocol data units (PPDU)) bit and other signaling and reserved bits.

In accordance with an alternative of this embodiment, the presence of control field 40, indicated by the RDG/more-PPDU bit being set to 1, where the control field 40 is preferably the high throughput control (HT) field, and carries RDG/More-PPDU bit signalling with other HT control signalling. A preferable description of the RDG/More PPDU Data bit is set forth in Table 1:

TABLE 1

| RDG/More-PPDU bit | In frame from Initiator MP | In frame from Responder MP |
|---|---|---|
| 0 | No Reverse Grant present | The PPDU carrying the frame is the last in the reverse transmission |

TABLE 1-continued

| RDG/More-PPDU bit | In frame from Initiator MP | In frame from Responder MP |
|---|---|---|
| 1 | A reverse grant is present and has a time as indicated in the Duration/ID field | The PPDU carrying the frame is NOT the last in the reverse transmission |

In addition to RDG/More-PPDU bit signalling, an additional field/bit(s) may be involved that indicates the constraint on the type of traffic that can be sent in the reverse direction. For example, if this field/bit(s) is set to 0 then there is no constraint on the type of traffic (i.e., any traffic type regardless of access priority); Contrariwise, a non-zero value preferably indicates the type of constraint on the traffic that can be sent in the reverse direction. In a simple exemplary case, when this bit is set to 0, any transmission is allowed, when the bit is to set 1, for example, transmission is constrained to the same category/type of traffic as the originator category/type of traffic.

In each of the above embodiments, enhanced forwarding control 20 and control field 40, may alternatively identify a group of MPs to which control of the TxOP has been passed.

In each of the above embodiments, it should be appreciated by those having skill in the art, the order of occurrence of the fields may be different from the examples shown in the figures without deviating from the purpose of the invention disclosed in each embodiment.

In yet another embodiment, the explicit signal for control exchange is a dedicated frame specifying the passing of the control of the TxOP as disclosed above.

An alternative embodiment to the use of an explicit signal for control exchange, is the use of implicit signaling. In accordance with this embodiment, implicit signaling has defined rules stored in a database of an MP 15, whereby, upon the end of a transmission and after a certain time (e.g. Distributed Coordination Function (DCF) Interface Space (DIFS)), the control of the TxOP is passed on to a specific MP or a group of MPs based on these defined rules.

The reverse transmission by a receiver/responder MP may be ended by giving back TxOP control to originator MP by setting the More-PPDU flag to 0, giving back TxOP control to originator MP by sending a QoS-Null data frame, (or any other type of frame that indicates end of data transmission), or terminating the TxOP by sending a CF-End frame by the receiver/responder MP (which may be followed by CF-End frames from neighbor MPs as described later).

If the control of the TxOP is returned to the originator MP, the originator MP may transmit data after Short Interframe Space (SIFS) until the end of the TxOP or relinquish/truncate the TxOP.

If the originator MP, after making a reverse direction grant senses the medium idle for a PCF Interframe Space (PIFS) duration, it may then start transmitting in continuation of its TxOP.

The reverse direction TxOP may be terminated by transmission of a CF-End frame by the originator MP after regaining control of the TxOP (which may be followed by CF-End frames from neighbor MPs), or by the transmission of a CF-End frame by the receiver/responder MP (which may be followed by CF-End frames from neighbor MPs), as disclosed hereinafter.

In order for the originator MP to effectively allocate resources for the reserve direction, information about the reverse direction traffic characteristics including, for example, minimum, mean & peak data rates, packet size, and delay bounds, may be used if available. If such traffic characteristics are not available, or the traffic is bursty in nature, feedback from the responder MP(s) may be used to allocate resources.

In accordance with this embodiment, if the initial reverse direction allocation by the originator MP based on available data is not sufficient, then the responder MP transmits the data that fits within the allocation, and makes a resource request for the remaining data to be transmitted. It is preferable that the receiver/responder MP sends the resource request/feedback in the queue size field of the Quality of Service (QoS) control field of a Qos frame. Alternatively, the receiver/responder MP may send the resource request/feedback in the TxOP Request field of the QoS control field of a Qos frame. A subsequent reverse direction allocation by the originator MP may be based on this resource request/feedback from the receiver/responder MP.

In spite of attempts to make accurate resource allocations, in situations where the TxOP duration is more than required, an efficient mechanism to relinquish/truncate the TxOP is necessary. In accordance with an embodiment of the present invention, a CF-End frame is transmitted by all MPs, whether the MP is a Mesh AP or not.

Accordingly, an originator or receiver/responder MP transmits a CF-End frame to relinquish/truncate a TxOP or to relinquish/truncate its TxOP or to relinquish/truncate its TxOP after the completion of data transmission in a reverse direction grant. When the other MPs detect the CF-End frame, each MP resets its NAV. One or more neighboring MPs to the originator or receiver/responder MP that transmitted the CF-End frame, transmits its own CF-End frame within a SIFS, PIFS, or any other IFS as determined by the mesh network operating parameters. It should be noted that only one CF-End transmission by the neighboring MPs is allowed to prevent a "chain-reaction" of CF-End transmissions. By allowing the MPs neighbors to also transmit CF-End frames when they receive a CF-End frame, there is a reduction in hidden node/MPs and associated problems with collisions.

An originator MP may also transmit a CF-End frame to relinquish/truncate its TxOP after the completion of a reverse direction grant. As such, upon receipt of a QoS-Null data frame (or other type of frame indicating end of data transmission) from a receiver/responder MP. The originator MP transmits the CF-End frame followed by the transmission of a CF-End frame by the neighboring MP(s) as disclosed above.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for communicating in a wireless network, the method comprising: receiving, from a first node, a first packet including a remaining portion of a transmit opportunity (TxOP) with a predefined duration time, wherein the first packet is associated with a time to live field;
    wherein the time to live field is not used to indicate the predefined duration time of the remaining portion of the TxOP; and
    transmitting the first packet directly to a second non-access point (non-AP) node using the remaining portion of the TxOP.

2. The method of claim 1, wherein the first packet includes an enhanced forwarding control header.

3. The method of claim 2, wherein the first packet comprises a control field.

4. The method of claim 3, wherein the control field further comprises a reverse direction grant (RDG)/More-Physical layer protocol data unit (PPDU) bit.

5. The method of claim 4, wherein the control field is a high throughput (HT) control field.

6. The method of claim 4, wherein the RDG/More-PPDU bit is zero.

7. The method of claim 1, wherein the first node is an originating node; and the first packet is received at a non-AP node.

8. The method of claim 1, further comprising on a condition that the duration time has not expired, receiving control of the remaining portion of the TxOP from the first node.

9. The method of claim 8, wherein the first packet includes an indication that control of the remaining portion of the TxOP has been passed on to a plurality of non-AP nodes.

10. A node for communicating in a wireless network, the node comprising:
    a receiver configured to receive, from a first node, a first packet including a remaining portion of a transmit opportunity (TxOP) with a predefined duration time, wherein the first packet is associated with a time to live field;
    wherein the time to live field is not used to indicate the predefined duration time of the remaining portion of the TxOP; and
    a transmitter configured to transmit the first packet directly to a second non-access point (non-AP) node using the remaining portion of the TxOP.

11. The node of claim 10, wherein the first packet includes an enhanced forwarding control header.

12. The node of claim 11, wherein the first packet comprises a control field.

13. The node of claim 12, wherein the control field further comprises a reverse direction grant (RDG)/More-Physical layer protocol data unit (PPDU) bit.

14. The node of claim 13, wherein the control field is a high throughput (HT) control field.

15. The node of claim 13, wherein the RDG/More-PPDU bit is zero.

16. The node of claim 10, wherein the first node is an originating node, and the first packet is received at a non-AP node.

17. The node of claim 10, wherein the receiver is further configured to receive control of the remaining portion of the TxOP from the first node on a condition that the duration time has not expired.

18. The node of claim 17, wherein the first packet includes an indication that control of the remaining portion of the TxOP has been passed on to a plurality of non-AP nodes.

* * * * *